United States Patent
Bathurst et al.

(10) Patent No.: US 9,432,237 B2
(45) Date of Patent: Aug. 30, 2016

(54) VOIP DEVICE, VOIP CONFERENCING SYSTEM, AND RELATED METHOD

(75) Inventors: Tracy A. Bathurst, South Jordan, UT (US); Derek Graham, South Jordan, UT (US); Michael Braithwaite, Round Rock, TX (US); Russell S. Ericksen, Spanish Fork, UT (US); Brett Harris, Orem, UT (US); Sandeep Kalra, Salt Lake City, UT (US); David K. Lambert, South Jordan, UT (US); Peter H. Manley, Draper, UT (US); Ashutosh Pandey, Murray, UT (US); Bryan Shaw, Morgan, UT (US); Michael Tilelli, Syracuse, UT (US); Paul R. Bryson, Austin, TX (US)

(73) Assignee: CLEARONE, INC., Salt Lake City, UT (US)

( * ) Notice: Subject to any disclaimer, the term of this patent is extended or adjusted under 35 U.S.C. 154(b) by 628 days.

(21) Appl. No.: 13/493,934

(22) Filed: Jun. 11, 2012

(65) Prior Publication Data

US 2013/0094653 A1  Apr. 18, 2013

Related U.S. Application Data

(60) Provisional application No. 61/495,984, filed on Jun. 11, 2011.

(51) Int. Cl.
*H04R 5/00* (2006.01)
*H04L 29/06* (2006.01)
*G10L 19/16* (2013.01)
(Continued)

(52) U.S. Cl.
CPC ............. *H04L 29/06* (2013.01); *G10L 19/167* (2013.01); *H04M 3/568* (2013.01); *H04R 5/02* (2013.01); *H04S 7/30* (2013.01); *H04N 7/15* (2013.01);
(Continued)

(58) Field of Classification Search
CPC .................. H04M 3/56; H04M 3/568; H04M 2203/509; H04M 7/006; H04R 1/406; H04S 2420/03; H04S 3/008; H04S 1/007
USPC .......... 381/17, 66, 310; 379/202.01, 220.01; 704/201; 370/352; 715/757
See application file for complete search history.

(56) References Cited

U.S. PATENT DOCUMENTS 6,058,435 A  5/2000  Sassin et al.
6,212,550 B1  4/2001  Segur
(Continued)

*Primary Examiner* — Vivian Chin
*Assistant Examiner* — Ammar Hamid
(74) *Attorney, Agent, or Firm* — Matthew J. Booth & Associates PLLC; Matthew J. Booth

(57) ABSTRACT

Voice over internet protocol (VoIP) devices and conferencing systems may include a spatial encoder associated with a first endpoint and a spatial renderer associated with a second endpoint. The spatial renderer may configured to receive audio data. The audio data may be rendered among a plurality of speakers based on a first set of spatial information for a plurality of microphones associated with the first endpoint, and a second set of spatial information for the plurality of speakers associated with the second endpoint. A method for generating a sound field may include determining spatial information for a plurality of microphones in a local room, determining spatial information for a plurality of speakers in a remote room, mapping the spatial information for the plurality of microphones and the spatial information for the plurality of speakers, and generating a sound field in the remote room based on the mapping.

19 Claims, 12 Drawing Sheets

(51) Int. Cl.
  *H04R 5/02* (2006.01)
  *H04S 7/00* (2006.01)
  *H04M 3/56* (2006.01)
  *H04N 7/15* (2006.01)
  *H04S 1/00* (2006.01)

(52) U.S. Cl.
  CPC ............ *H04S 1/007* (2013.01); *H04S 2400/13* (2013.01); *H04S 2400/15* (2013.01)

(56) References Cited

U.S. PATENT DOCUMENTS

| | | |
|---|---|---|
| 6,233,332 B1 | 5/2001 | Anderson et al. |
| 6,934,381 B1 | 8/2005 | Klein et al. |
| 2002/0007398 A1 | 1/2002 | Mendiola et al. |
| 2003/0016657 A1 | 1/2003 | Creamer et al. |
| 2004/0041902 A1 | 3/2004 | Washington |
| 2004/0083195 A1 | 4/2004 | McCord et al. |
| 2004/0225753 A1 | 11/2004 | Marriott et al. |
| 2005/0099995 A1 | 5/2005 | Blossom et al. |
| 2005/0231587 A1 | 10/2005 | Root et al. |
| 2006/0123060 A1 | 6/2006 | Allen et al. |
| 2007/0130271 A1 | 6/2007 | Ye et al. |
| 2007/0156924 A1 | 7/2007 | Ramalingam et al. |
| 2007/0168449 A1 | 7/2007 | Malik et al. |
| 2007/0237154 A1 | 10/2007 | Kalinichenko et al. |
| 2007/0239880 A1 | 10/2007 | Alperin et al. |
| 2007/0239895 A1 | 10/2007 | Alperin et al. |
| 2007/0263079 A1 | 11/2007 | Graham et al. |
| 2008/0144794 A1* | 6/2008 | Gardner ................ H04L 65/403 379/202.01 |
| 2008/0159520 A1 | 7/2008 | Annadata et al. |
| 2008/0215694 A1 | 9/2008 | Chen et al. |
| 2008/0232044 A1 | 9/2008 | Moscovitch |
| 2009/0046139 A1 | 2/2009 | Cutler et al. |
| 2009/0080632 A1* | 3/2009 | Zhang ................... H04M 3/568 379/202.01 |
| 2009/0260547 A1 | 10/2009 | Epstein et al. |
| 2010/0193653 A1 | 8/2010 | Sweere et al. |
| 2010/0249571 A1 | 9/2010 | Jensen et al. |
| 2010/0271287 A1 | 10/2010 | Bourne et al. |
| 2010/0321467 A1 | 12/2010 | Goodman |
| 2011/0242268 A1 | 10/2011 | Kim et al. |
| 2011/0278414 A1 | 11/2011 | Theis et al. |
| 2011/0292161 A1 | 12/2011 | Sharon et al. |
| 2012/0013705 A1 | 1/2012 | Taylor et al. |
| 2012/0293602 A1 | 11/2012 | Bathurst et al. |
| 2012/0327171 A1 | 12/2012 | Cho |
| 2013/0097333 A1 | 4/2013 | Bathurst et al. |

* cited by examiner

VOIP DEVICE, VOIP CONFERENCING SYSTEM, AND RELATED METHOD

CROSS-REFERENCE TO RELATED APPLICATIONS

This application claims the benefit of U.S. Provisional Patent Application Ser. No. 61/495,984, filed Jun. 11, 2011 and entitled "VOIP Engine," the disclosure of which is incorporated herein in its entirety by this reference. This application is further related to U.S. patent application Ser. No. 13/398,662, filed Feb. 16, 2012, and entitled "Executive Telepresence System," which claims the benefit of U.S. Provisional Patent Application Ser. No. 61/443,471, filed Feb. 16, 2011, and entitled "Executive Telepresence System," the disclosures of each of which are incorporated herein in their entirety by this reference.

TECHNICAL FIELD

The present disclosure generally relates to a voice over internet protocol (VoIP) device. More particularly, embodiments of the present disclosure relate to spatially rendering audio data from a local room to a remote room.

BACKGROUND

Voice over internet protocol (VoIP) is a technique for delivering voice information using an internet protocol (IP) network, such as the Internet. Generally, VoIP is not a traditional protocol based on a link, as in a public switched telephone network (PSTN), but rather is a protocol that transmits voice information in a digital form within discrete packets. In conventional VoIP devices, audio data may be mixed, encoded, and transmitted from one VoIP device to another VoIP device, such as in a VoIP conferencing application. For situations in which the microphone elements and the speaker elements to not align on a point-to-point basis, the sound field produced in a remote room may lose the effect of the location of the sound source within the local room.

SUMMARY

Embodiments of the present disclosure include a voice over internet protocol (VoIP) device. The VoIP device comprises a spatial renderer associated with a second endpoint, the spatial renderer configured to receive audio data from a first endpoint. The spatial renderer is further configured to render the audio data among a plurality of speakers based, at least in part, on a first set of spatial information for a plurality of microphones associated with the first endpoint, and a second set of spatial information for the plurality of speakers associated with the second endpoint.

Another embodiment of the present disclosure includes a voice over internet protocol (VoIP) conferencing system. The VoIP conferencing system comprises a local endpoint comprising a spatial encoder configured to send a first set of spatial information to a remote endpoint, and receive a second set of spatial information from a spatial renderer of the remote endpoint. The first set of spatial information includes relative position information for a plurality of microphones. The second set of spatial information includes relative position information for a plurality of speakers.

A particular embodiment includes a method of generating a sound field in a remote room from captured audio signals in a local room. The method comprises determining spatial information for a plurality of microphones in the local room, determining spatial information for a plurality of speakers in the remote room, mapping the spatial information for the plurality of microphones and the spatial information for the plurality of speakers, and generating a sound field in the remote room based on the mapping.

DETAILED DESCRIPTION

Figure 1:
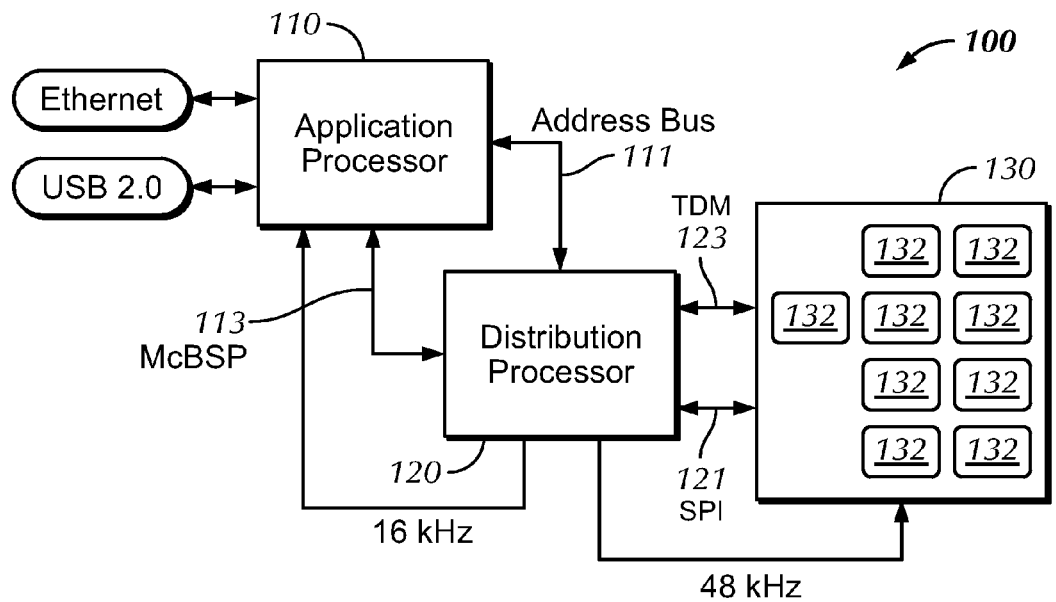
FIG. 1 is a schematic block diagram of a VoIP engine according to an embodiment of the present disclosure.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

A "stream" and a "channel" may be used interchangeably herein. A "microphone" and a "microphone element" may be used interchangeably herein. A "speaker" and a "speaker element" may be used interchangeably herein.

FIG. 1 is a schematic block diagram of a VoIP engine 100 according to an embodiment of the present disclosure. The VoIP engine 100 may be configured to provide a connection between an audio conferencing system and a VoIP-based private branch exchange (PBX) phone system so that a user may transport audio signals across an IP network. The VoIP engine 100 may deliver wideband audio signals having transport layer security (TLS), advanced encryption standard (AES), secure real-time transport protocol (SRTP), or other similar encryption. In addition, the VoIP engine 100 may be further configured to provide a session initiated protocol (SIP) transport method for connecting with a far-end device, such as in a far-end conference room.

The VoIP engine 100 includes an application processor 110, a distribution processor 120, and a processor farm 130. The application processor 110 may be coupled to the distribution processor 120, which may be coupled to the processor farm 130.

The application processor 110 may be configured as a main processor running the application code for the VoIP engine 100, as well as being configured to function as the voice engine for the VoIP engine 100. The application processor 110 may be configured to perform a variety of different audio processing operations, such as data compression, handling the communication protocol (e.g., session initiation protocol (SIP)), etc. As an example, the application processor 110 may be a microprocessor having an integrated silicon platform (e.g., system on a chip) configured for VoIP and broadband applications, such as the TNETV1050 microprocessor available from Texas Instruments, Inc. of Dallas, Tex. Other similar microprocessors may also be employed to implement embodiments of the disclosure.

The distribution processor 120 may be configured to distribute commands between the application processor 120 to the processor farm 130. For example, in one operation (e.g., the VoIP engine 100 receiving data through Ethernet, USB, or other external port), the application processor 110 may transmit signals (e.g., commands, data, etc.) to the processor farm 130. The signals may be transmitted through an address bus 111 (e.g., parallel address bus) and a first communication bus 113 (e.g., multi-channel buffered serial port (McBSP)) to the distribution processor 120, and the distribution processor 120 may distribute the signals to the processor farm 130 via one or more communication buses 121, 123. The one or more communication busses 121, 123 may include a serial peripheral interface (SPI) bus 121 or a time-division multiplexing (TDM) bus 123. In the reverse operation (e.g., the VoIP engine 100 transmitting data through Ethernet, USB, or other external port), the distribution processor 120 may distribute the signals from the processing farm 130 to the application processor 110.

In addition, the distribution processor 120 may be further configured to perform other operations, such as format conversion of the signals, in addition to simply distributing the signals. The distribution processor 120 may be further configured to serve as the master time source and router for the audio slots associated with the various audio buses. The audio signals received by the processor farm 130 may be sampled and processed at a sampling rate and resolution. The application processor 110 may also be operated at a certain rate and resolution. For example, audio samples may be processed using 24 bit resolution at 48 KHz in the processor farm 130, and using 16 bit resolution at 16 KHz in the application processor 110. In embodiments using different sampling rates, the distribution processor 120 may include a sample rate converter.

The processor farm 130 may include a plurality of processing resources 132 configured for conferencing, transcoding, and media termination point (MTP) services. For example, the processor farm 130 may be configured to handle operations, such as echo cancellation, gain control, noise reduction, etc. In some embodiments, the processor farm 130 may be a DSP farm including a plurality of DSP resources.

Data and commands may be sent over the McBSP bus 113 between the application processor 110 and the distribution processor 120. Between the distribution processor 120 and the processor farm 130, data may be sent over the TDM bus 123 and commands may be sent over the SPI bus 121. In some embodiments, the distribution processor 120 may be configured to act as a memory bank to temporarily store information during operation of the VoIP engine 100. The address bus 111 may be used to provide addresses to the distribution processor 120 to access such information.

Thus, to receive audio streams, the VoIP engine 100 may receive the audio streams at the application processor 110 (e.g., via Ethernet, USB, etc), which may decompress the audio streams, decode, and perform other VoIP processing. The audio streams may be further transmitted to the processor farm 130 for other processing, such as noise cancellation. In transmit mode for transmitting audio streams, sound may be captured by microphone elements coupled with the processing farm 130, which may sample the audio signals and send the audio signals to the application processor 110. The application processor may perform compression of the audio signals, encoding, packetizing, and other VoIP processing. The compressed audio stream may be transmitted to a remote endpoint (e.g., via Ethernet, USB, etc.).

The VoIP engine 100 may be further configured to determine spatial information for the microphone elements and/or speaker elements associated therewith. As a result, in transmit mode as a local endpoint, the VoIP engine 100 may be configured to determine how to encode audio data for maintaining an appropriate spatial effect for the audio data having knowledge of the spatial information of the speaker elements of the remote endpoint. In receive mode, the VoIP engine 100 may be configured to determine how to render the audio data to produce a sound field that maintains at least some of the spatial effects. Additional detail regarding such spatial rendering is described below with reference to FIGS. 8 through 14.

Figure 2:
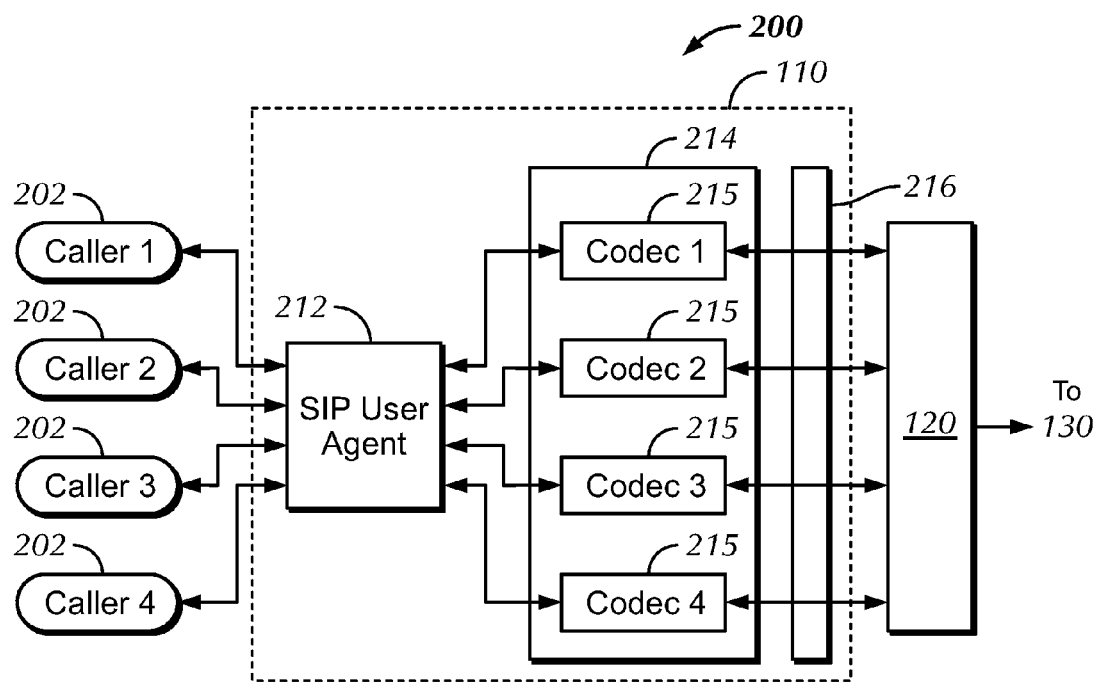
FIG. 2 is a schematic block diagram of a VoIP engine according to an embodiment of the present disclosure.

FIG. 2 is a schematic block diagram of a VoIP engine 200 according to an embodiment of the present disclosure. The VoIP engine 200 includes the application processor 110, the distribution processor 120, and the processor farm 130 (FIG. 1), which may be configured generally as described above. The application processor 110 further includes a session initiation protocol (SIP) user agent 212, an internal processor 214, and a McBSP port 216.

The SIP user agent 212 may include a processor configured to manage a SIP session. The SIP user agent 212 may receive data from or transmit data to a plurality of different callers 202 over an external link (e.g., Ethernet, USB, etc.). The data streams between the callers 202 and the SIP user agent may include real-time transport protocol (RTP) packets (i.e., RTP streams).

The internal processor 214 may be a DSP core (e.g., C55 processor) processor for the application processor 110. The internal processor 214 may include a plurality of codecs 215 used to process the data. In particular, the codecs 215 may be configured to encode and decode the data input and output from the application processor 110. As an example, the codecs 215 may configured for compression and/or decompression of data depending on the flow of data. The codecs 215 may also be configured for various communications standards, including G.722, G.711, and G.729AB.

The codecs 215 may be further configured for supporting other features, such as audio coding-low delay (AAC-LD). Such a feature may be configured as a single instance in a point-to-point call, which may result in an increase of the resolution and sampling rate at the application processor 110. For example, the resolution may be increased to 24 bit resolution at a sampling rate of 48 kHz. As a result, the resolution and sampling rate of the application processor 110 and the processor farm 130 (FIG. 1) may be the same, such that a full sample from the processor farm 130 may be transmitted from the VoIP engine 200 rather than a down-converted sample. As a result, the full sample may provide uncompressed RTP data transmitted out of the VoIP engine 200 to another device as a full band audio stream covering the full range of human hearing.

With data being received from a plurality of callers 202, the VoIP engine 200 may be configured for supporting a bridge call. For example, the plurality of data streams from each caller 202 may be received as independent audio samples on dedicated audio slots. The mixing of the plurality of data streams may be performed within the processor farm 130 (FIG. 1).

Figure 3:
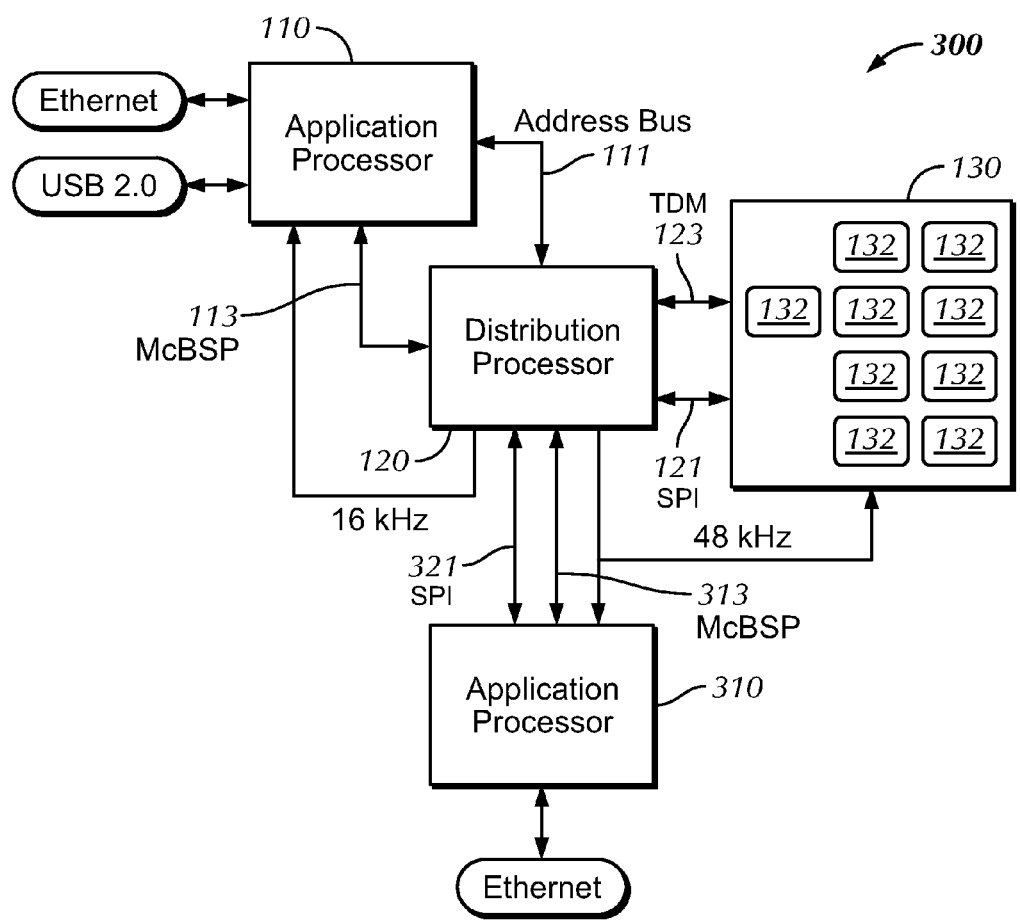
FIG. 3 is a schematic block diagram of a VoIP engine according to another embodiment of the present disclosure.

FIG. 3 is a schematic block diagram VoIP engine 300 according to another embodiment of the present disclosure. The VoIP engine 300 includes an application processor 110, a distribution processor 120, and a processor farm 130 configured generally as described before. The VoIP engine 300 may further include another application processor 310 operably coupled with the distribution processor 120. The application processor 310 may be a dedicated processor configured for mixing data received by the first application processor 110 and the processor farm 130.

The data from received by the first application processor 110 (e.g., via Ethernet, USB, etc.) may remain uncompressed for mixing with the data from the processor farm 130. For example, an audio signal may be received from either the USB port or the Ethernet port to the first application processor 110. The audio signal may be transmitted to the second application processor 310 via the distribution processor 120 and the McBSP busses 113, 313. The processor farm 130 may also have microphone inputs such that the processor farm 130 may also receive an audio signal that is transmitted to the second application processor 310 via the distribution processor 120, the TDM bus 123 and the McBSP bus 313.

Embodiments of the present disclosure may further include VoIP devices that are configured to generate a spatial audio representation from a local room to a far end room. To enable such a spatial audio representation, the devices may include a VoIP transport layer configured to send multiple audio streams to the far end site.

Figure 4:
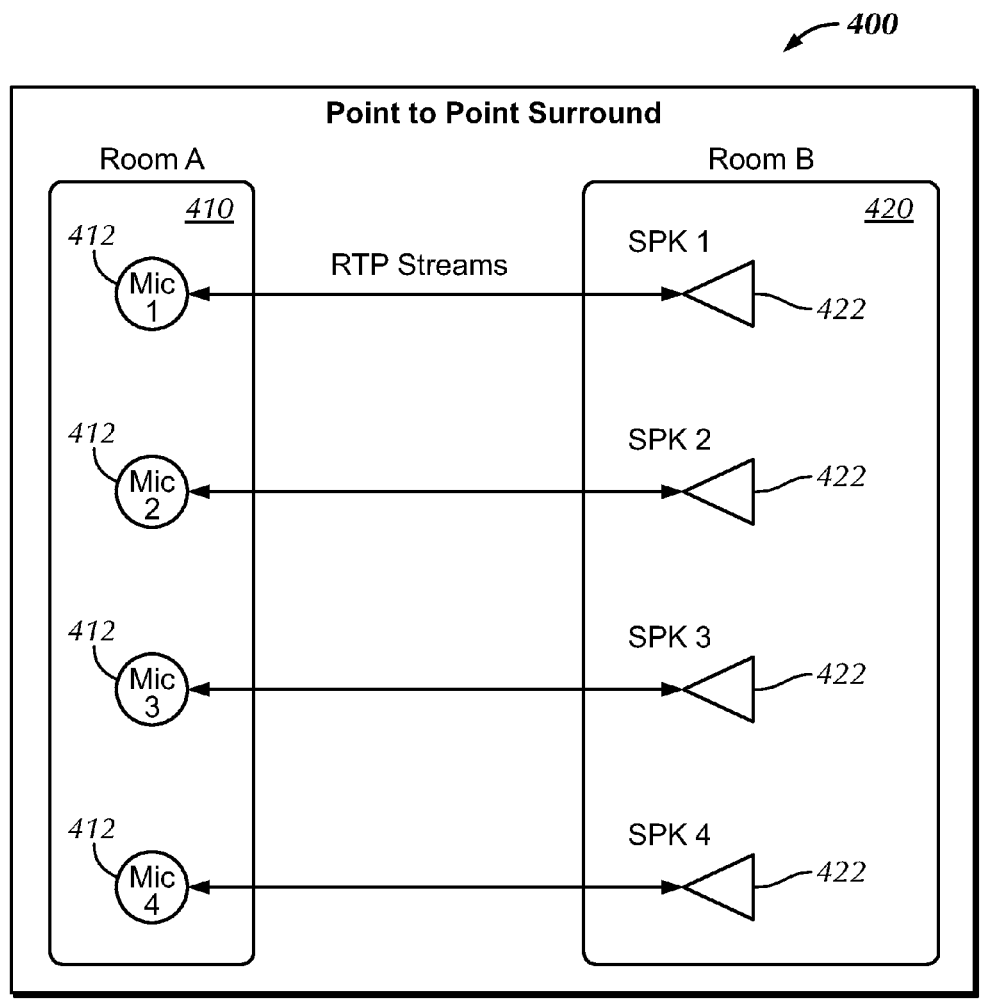
FIG. 4 is a schematic representation of a point-to-point surround sound call between two rooms according to an embodiment of the present disclosure.

FIG. 4 is a schematic representation of a point-to-point surround sound call 400 between two rooms 410, 420 according to an embodiment of the present disclosure. The first room 410 includes a plurality of microphones 412 for transmitting RTP streams of audio data to a plurality of speakers 422 in the second room 420. Each of the plurality of microphones 412 and the plurality of speakers 422 may be coupled to, or incorporated within, a VoIP engine that includes other processing components as described above.

As shown in FIG. 4, each audio channel corresponds to an individual microphone 412 and speaker 422 in a point-to-point manner. The four audio streams may be implemented in a surround mode with independent audio streams, while in some embodiments, the one or more of the audio streams may be implemented in a stereo mode that includes a left channel and right channel in the encoded packet. In addition to audio data, additional data may be transmitted, such as metering data used for room acoustical signal processing. Such additional data may be transmitted over a separate real-time control protocol (RTCP) channel.

Figure 5:
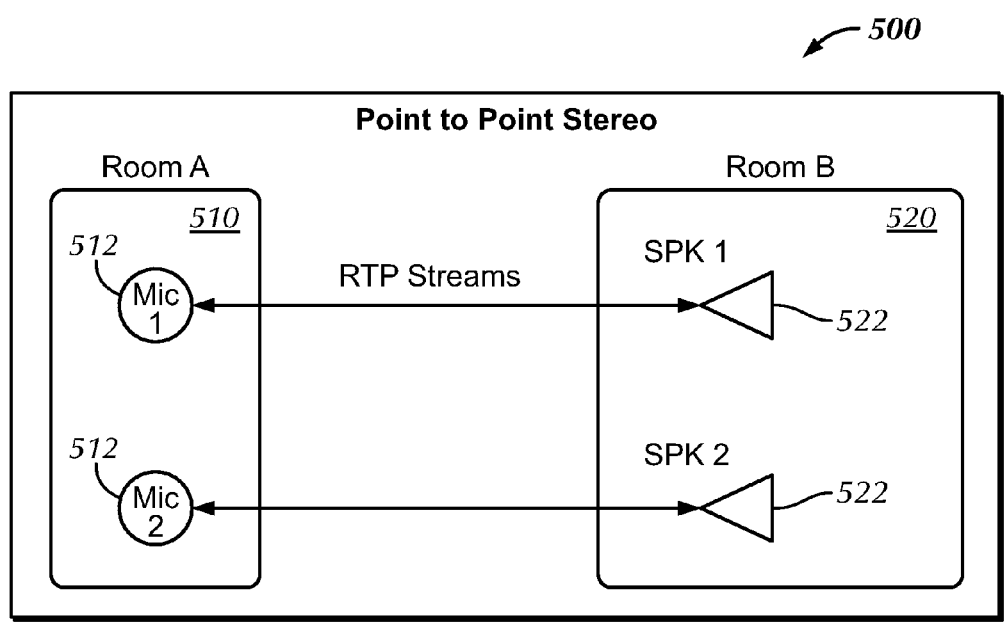
FIG. 5 is a schematic representation of a point-to-point surround sound call between two rooms according to an embodiment of the present disclosure.

FIG. 5 is a schematic representation of a point-to-point surround sound call 500 between two rooms 510, 520 according to an embodiment of the present disclosure. The first room 510 includes a plurality of microphones 512 for transmitting RTP streams of audio data to a plurality of speakers 522 in the second room 520. Each of the plurality of microphones 512 and the plurality of speakers 522 may be coupled to, or incorporated within, a VoIP engine that includes other processing components as described above. As shown in FIG. 5, each audio channel corresponds to an individual microphone 512 and speaker 522 in a point-to-point manner. The two audio streams may be implemented in a stereo mode with having a left channel and a right channel in the encoded RTP packets of the RTP streams.

Figure 6:
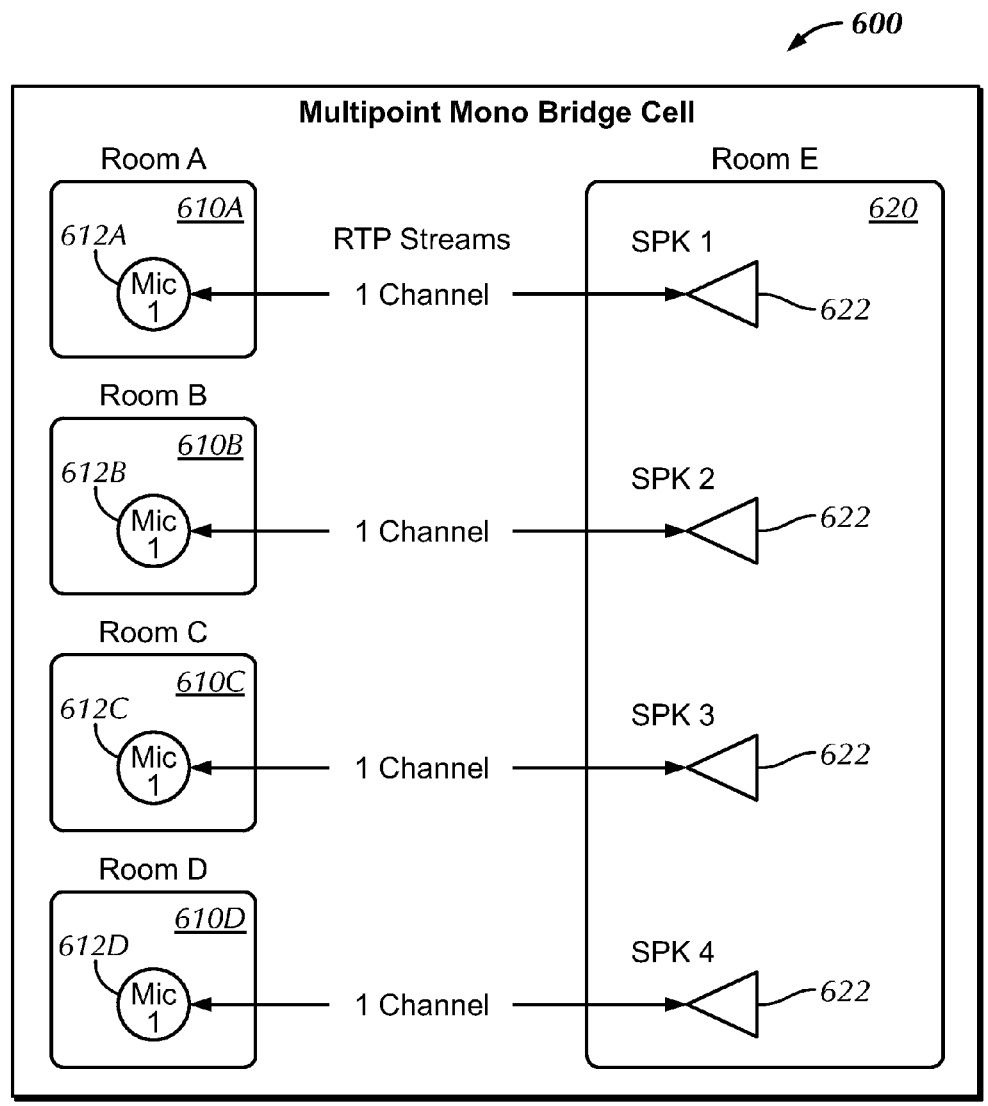
FIG. 6 is a schematic representation of a point-to-point mono sound bridge call between four near rooms and a far room according to an embodiment of the present disclosure.

FIG. 6 is a schematic representation of a point-to-point mono sound bridge call 600 between four near rooms 610A, 610B, 610C, 610D and a far room 620 according to an embodiment of the present disclosure. Each of the near rooms 610A, 610B, 610C, 610D include a microphone 612A, 612B, 612C, 612D, respectively, for transmitting RTP streams of audio data to a plurality of speakers 622 in the far room 620. Each of the plurality of microphones 612A, 612B, 612C, 612D and the plurality of speakers 622 may be coupled to, or incorporated within, a VoIP engine that includes other processing components as described above. As shown in FIG. 6, each audio channel corresponds to an individual microphone 612A, 612B, 612C, 612D and speaker 622 in a point-to-point manner.

Figure 7:
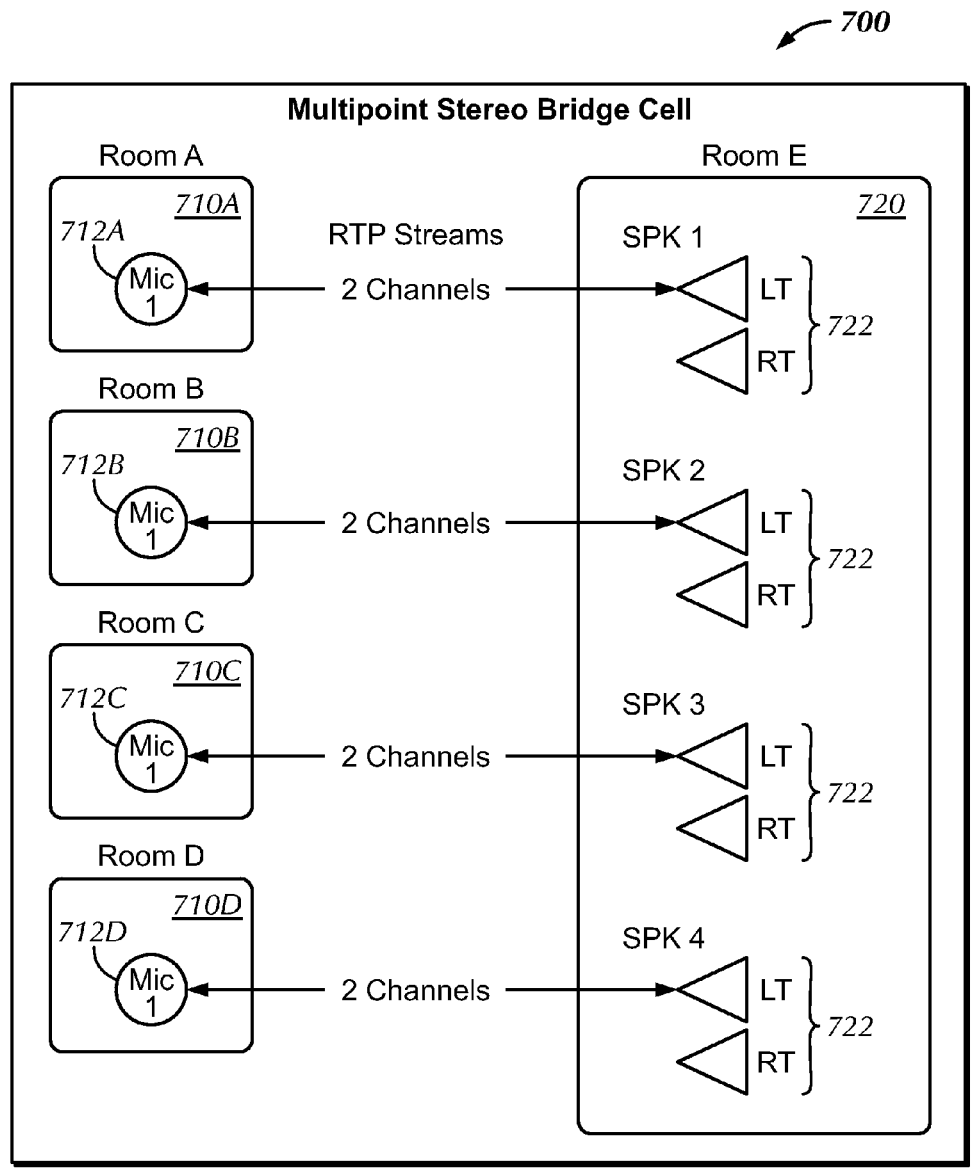
FIG. 7 is a schematic representation of a point-to-point stereo sound bridge call between four near rooms and a far room according to an embodiment of the present disclosure.

FIG. 7 is a schematic representation of a point-to-point stereo sound bridge call 700 between four near rooms 710A, 710B, 710C, 710D and a far room 720 according to an embodiment of the present disclosure. Each of the near rooms 710A, 710B, 710C, 710D include a microphone 712A, 712B, 712C, 712D, respectively, for transmitting RTP streams of audio data to a plurality of speaker pairs 722 in the far room 720. Each of the plurality of microphones 712A, 712B, 712C, 712D and the plurality of speaker pairs 722 may be coupled to, or incorporated within, a VoIP engine that includes other processing components as described above. As shown in FIG. 7, each audio channel corresponds to an individual microphone 712A, 712B, 712C, 712D and a speaker pair 722 in a point-to-point manner. Each audio stream may include two channels (e.g., a right channel and a left channel) corresponding to the two speakers of the speaker pair 722 for the encoded RTP packets of the RTP streams as a stereo bridge call.

Figure 8:
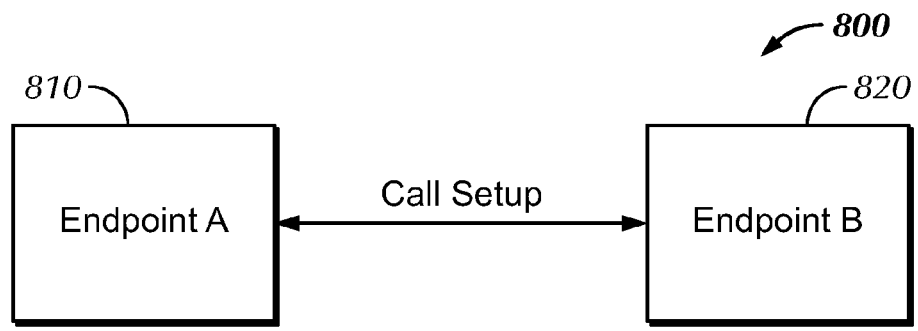
FIG. 8 is a schematic block diagram representing a call setup involving a plurality of endpoints according to an embodiment of the present disclosure.

FIG. 8 is a schematic block diagram representing a call setup 800 involving a plurality of endpoints 810, 820 according to an embodiment of the present disclosure. Although two endpoints 810, 820 are shown, embodiments are contemplated that may include any number of endpoints. The endpoints 810, 820 may include one or more microphone elements and/or speaker elements and other components that are included within a VoIP engine. The microphone elements of one endpoint (e.g., 810) may be located at different relative positions than the speaker elements of the other endpoint (e.g., 820). In addition, the number of microphone elements of one endpoint (e.g., 810) may not equal the number of speaker elements of the other endpoint (e.g., 820). In other words, the microphone elements and the speaker elements may not correspond to a point-to-point basis with each other either in number or in relative locations.

In some of the embodiments, a conferencing situation is described in which the first endpoint 810 is described as having microphones, while the second endpoint 820 is described as having speakers. In addition, the first endpoint 810 having microphones may be described as a local endpoint, while the second endpoint 820 having speakers may be described as a remote endpoint. Such a description should not be construed to imply that the first endpoint 810 does not have speakers, or that the second endpoint 820 does not have microphones. In many conferencing situations, each endpoint 810, 820 may both send and receive audio signals, and may act as a local endpoint and a remote endpoint during the same call.

The plurality of endpoints 810, 820 may establish a call (e.g., a conference call) therebetween. For example, the first endpoint 810 may initiate a call with the second endpoint 820. During call set up 800, the endpoints 810, 820 may pass call setup messages therebetween. Call setup messages may include information regarding the media capabilities of the endpoints 810, 820. For example, media capabilities may include the type of media (e.g., audio, video) supported by the endpoints 810, 820, as well as other information, such as formats supported, number of channels supported, which ports may be used for communication, etc. Media capabilities may be transmitted using Media Descriptions and SDP Attributes in SIP, Capability Exchange in H.323 protocol, or using other similar methods based on the media transport protocol.

A call set up message may further include spatial information regarding how the room for each endpoint 810, 820 is set up. Spatial information may include information regarding the relative positions and orientations of the speaker elements and microphone elements relative to a coordinate system within the rooms, as well as other information, such as directionality of the microphone elements and speaker elements. Such information may be defined by an installer of the audio system. In some embodiments, at least some of the spatial information may be dynamic, and may change over time during use of the audio system. In some embodiments, additional information regarding how sound may be reflected or absorbed within the room may be shared by the endpoints 810, 820. Such information may include, for example, dimensions and materials that are present in the room and may enable modeling of reflections within the room. Such information may assist in the spatial rendering to more accurately reconstruct the audio signals and maintain the spatial sound effects.

Figure 9:
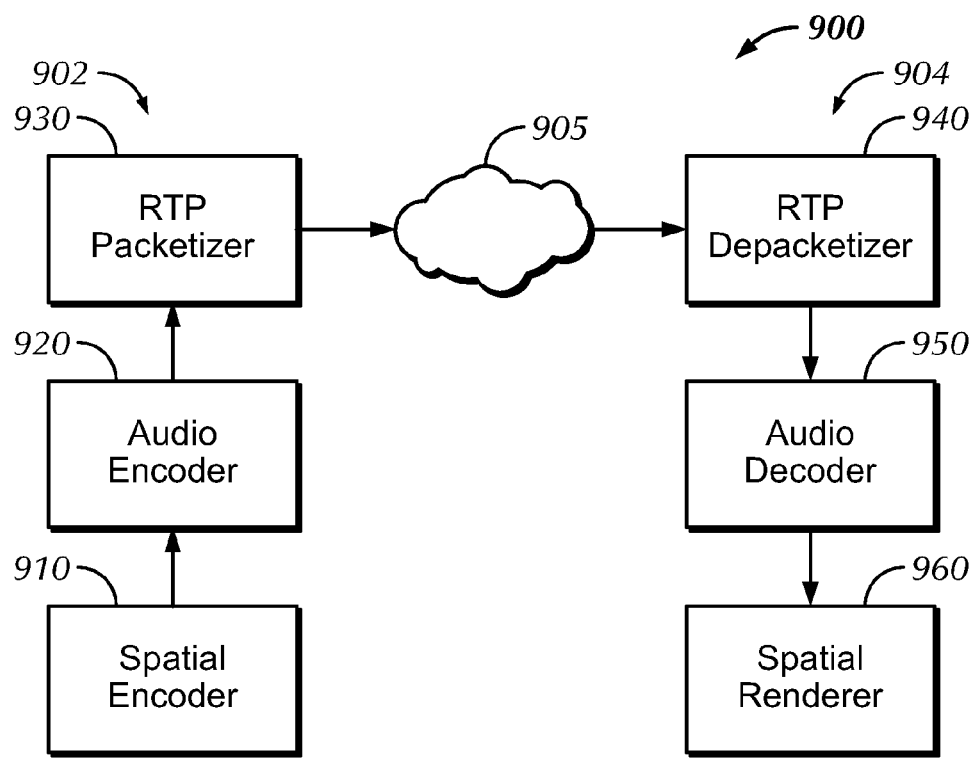
FIG. 9 is a media path for a plurality of endpoints according to an embodiment of the present disclosure.

FIG. 9 is a media path 900 for a plurality of endpoints 902, 904 according to an embodiment of the present disclosure. The plurality of endpoints 920, 904 may be coupled together through an IP network 905. The first endpoint 902 may include a spatial encoder 910, an audio encoder 920, and an RTP packetizer 930. The second endpoint 904 may include an RTP depacketizer 940, an audio encoder 950, and a spatial renderer 960. As discussed above, the first endpoint 902 may include a plurality of microphone elements, and the second endpoint 904 may include a plurality of speaker elements. As discussed above, the first endpoint 902 may be referred to as the local endpoint, and the second endpoint 904 may be referred to as the remote endpoint 904. The components of each of the endpoints 902, 904 may be incorporated within, a VoIP engine that may use the processing components described above to perform one or more of the functions described herein.

The spatial encoder 910 may capture audio data from the plurality of microphone elements and encode the audio data into separate audio streams. The input audio data may be mixed and encoded into a number of channels (i.e., streams) supported by the remote endpoint 904, and based on the spatial rendering capabilities and output locations of the speaker elements for the remote endpoint 904.

The audio encoder 920 may receive the individual audio streams from the spatial encoder 910 and compress the audio streams into different channels in a known audio transport protocol (e.g., AAC-LD, G.722, etc.).

The RTP packetizer 930 may receive the compressed individual audio streams from the audio encoder and form the compressed individual audio streams into RTP packet streams to be sent over the IP network 905 to the remote endpoint 904, such as by using RTP/RTCP protocol for such transmission.

Referring to the second endpoint 904, the RTP depacketizer 940 may receive the RTP packet streams from the first endpoint 902. The RTP depacketizer 940 may further handle jitter buffering between RTP packets for each RTP packet stream, and time align the outputs handed off to the audio decoder 950.

The audio decoder 950 may receive each RTP packet stream from the RTP depacketizer 940, and decode each RTP packet stream from a known audio transport protocol format to a supported uncompressed format that may be used by the spatial renderer 960.

The spatial renderer 960 may receive the individual uncompressed data streams from the audio decoder 950, and reconstruct the individual uncompressed data streams to be played out on speaker elements of the second endpoint 904. The spatial renderer may render the audio signals based on the spatial information for the microphone elements and the speaker elements in their respective rooms. As a result, the audio outputs played by the speaker elements of the second endpoint 904 may sound like it is being replicated spatially in the remote room as it was captured in the local room.

In summary, the spatial encoder 910 may define how each audio stream is created (e.g., including mixing the raw audio data from various individual microphones). The spatial encoder 910 may also map each audio stream to a particular location in the remote room to which the audio stream would be targeted. In other words, the local endpoint 902 may be configured to recommend placement of the audio stream within the sound field of the remote endpoint 904. The spatial renderer 960 may receive each audio stream and know which part of the remote room the audio stream is targeted for. The spatial renderer 960 may segment the remote room and determine which audio stream is played by which speaker element, as well as perform other controls such as adjusting volume and/or direction for the speaker elements located in the different targeted areas. Such a determination may be assisted by geometrically mapping coordinate systems for each set of spatial information. Defining coordinate systems and determining the spatial information will be discussed in further detail below.

In some embodiments, the raw audio data for each microphone element may be sent to the remote endpoint 904 without spatial encoding. In such an embodiment, the remote endpoint 904 may perform all processing with regard to spatial rendering (including mixing) having each set of spatial information as well as the raw audio data. As a result, the spatial encoder 910 may not be needed for such an embodiment. There may be certain advantages, however, to performing spatial encoding prior to transmitting audio data to the remote endpoint 904. For example, the remote endpoint 904 may have limited processing capabilities to perform such mixing of audio data. In addition, the remote endpoint 904 may have a limited number of channels available for receiving audio data. As a result, spatial encoding prior to sending audio data may keep more of the audio signal intact.

In some embodiments, the local room associated with the first endpoint 902 may have more microphone elements than speaker elements in the remote room associated with the second endpoint 904. For example, the local room may have ten microphones spaced in a grid configuration. The remote room may have two speakers that are configured to provide two stereo (L/R) channels to the remote room. The first endpoint 902 and the second endpoint 904 may share spatial information regarding their respective elements during call setup and negotiation. The spatial encoder 904 may determine how to mix the audio source data to generate the appropriate number of channels and in the appropriate manner to maintain spatial effects of the audio sources. For example, the spatial encoder may mix the audio signals from the five left-most microphone elements into a left channel, and mix the audio signals from the five right-most microphone elements into a right channel. The spatial renderer 960 may receive the mixed audio signals in the left channel and right channel, and, using the spatial information, the spatial renderer 960 may determine the appropriate speaker elements for playback as well as other playback characteristics.

In some embodiments, the local room may include fewer microphone elements than speaker elements in the remote room. Using the spatial information, the spatial encoder 910 may determine how to mix the audio source data to generate the appropriate number of channels and in the appropriate manner to maintain spatial effects of the audio sources. The spatial renderer 960 may receive the mixed audio signals, and, using the spatial information, the spatial renderer 960 may determine the appropriate speaker elements for playback as well as other playback characteristics.

In some embodiments, the local room and the remote room may have the same number of microphone elements and speaker elements. While it may be possible to have a one-to-one correspondence of channels between the two endpoints 902, 904 (see, e.g., FIGS. 4 and 5), the relative locations of the microphone elements and speaker elements may be not match from one room to the other room. Thus, without using spatial information for spatial rendering the audio signals, at least some (if not most) spatial effects of the sound may be lost. As a result, using the spatial information, the spatial encoder 910 may determine an appropriate mix for the audio signals based on the spatial information of both the microphone elements and the speaker elements. Likewise, the spatial renderer 920 may use the spatial information to determine the appropriate rendering on the remote endpoint 904.

While certain numbers and configurations are described and shown in the various figures herein, any number or configuration is contemplated as an embodiment of the present disclosure. Such numbers and configurations should not be limited unless specifically described as being so limited. In addition, the different coordinate systems chosen for each room may be roughly the same. As a result, the coordinate systems may be superimposed on each other when mapping the coordinate systems and the spatial information during spatial encoding and spatial decoding. In some embodiments, the coordinate systems may be roughly the same, but that the mapping may be performed by creating a mirror image of the other coordinate system during spatial encoding and spatial decoding. In some embodiments, the coordinate systems may be substantially different (e.g., the rooms have substantially different dimensions). As a result, a more complex mapping (or a simplified estimate of one or more of the rooms) may be performed during spatial encoding and spatial decoding. In some embodiments, room sizes may be substantially different, and a scaling factor may be applied such that the sound may be reproduced in the remote room to sound either closer or further away (as the case may be) than may actually be the case in the local room.

Figure 10:
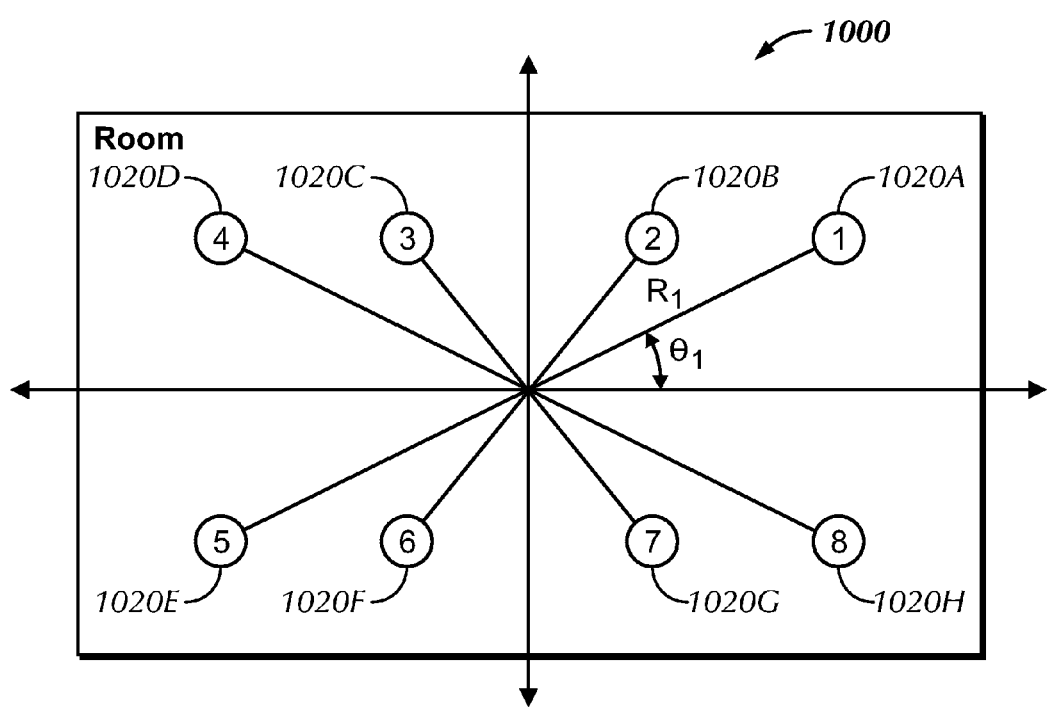
FIG. 10 is an illustration of a room including a plurality of speakers according to an embodiment of the present disclosure.

FIG. 10 is an illustration of a room 1000 including a plurality of speakers 1020A-1020H according to an embodiment of the present disclosure. Each of the plurality of speakers 1020A-1020H may be coupled to, or incorporated within, a VoIP engine that includes other processing components as described above. The plurality of speakers 1020A-1020H, in conjunction with a VoIP engine, may be configured to output spatially encoded audio signals received from an endpoint having a plurality of microphones. In particular, FIG. 10 shows an example of how the spatial information regarding the speakers may be defined relative to a coordinate system. The coordinate system may be defined as an XY axis. As an example, the relative locations of the speakers may be defined in polar coordinates. For example, the first speaker 1020A may have spatial information associated therewith, such as a radius ($R_1$) and an angle relative to the coordinate system. The radius ($R_1$) may be measured from the origin of the coordinate system, and the angle ($\theta_1$) may be measured from the positive X axis of the coordinate system. Each of the other speakers 1020B-1020H may have spatial information associated therewith, which may be defined in a similar manner. Of course, other coordinate systems and coordinate systems may be employed for determining positions of the speakers relative to each other using a coordinate system. For example, Cartesian coordinates may be employed, such that an (X,Y) coordinate for each speaker 1020A-1020H may be determined.

In some embodiments, the speakers 1020A-1020H may be non-directional (in other words, they are omni-directional) and generate sound in all directions rather than favoring a specific direction. For example, the speakers 1020A-1020H may be configured as ceiling speakers in the room 1000. In some embodiments, speakers may be directional and generate sound to favor a specific direction. For example, speakers may be wall-mounted speakers, mounted to a video screen, etc., and may point in a direction that is different than toward the horizontal plane. In some embodiments, speakers may include a speaker array configured to generate a beam pattern such that the beam pattern is directional. Such speakers may further be configured to steer the beam pattern to be directed and favor a particular direction. In such embodiments including directional speakers, the spatial data may further include directional data in addition to location and orientation of the speakers. In addition, for embodiments where the beam pattern may be steered, the directional data may be combined with the other spatial data during rendering of the incoming audio signals such that the rendering may include steering the beam patterns of one or more of the speakers.

Figure 11:
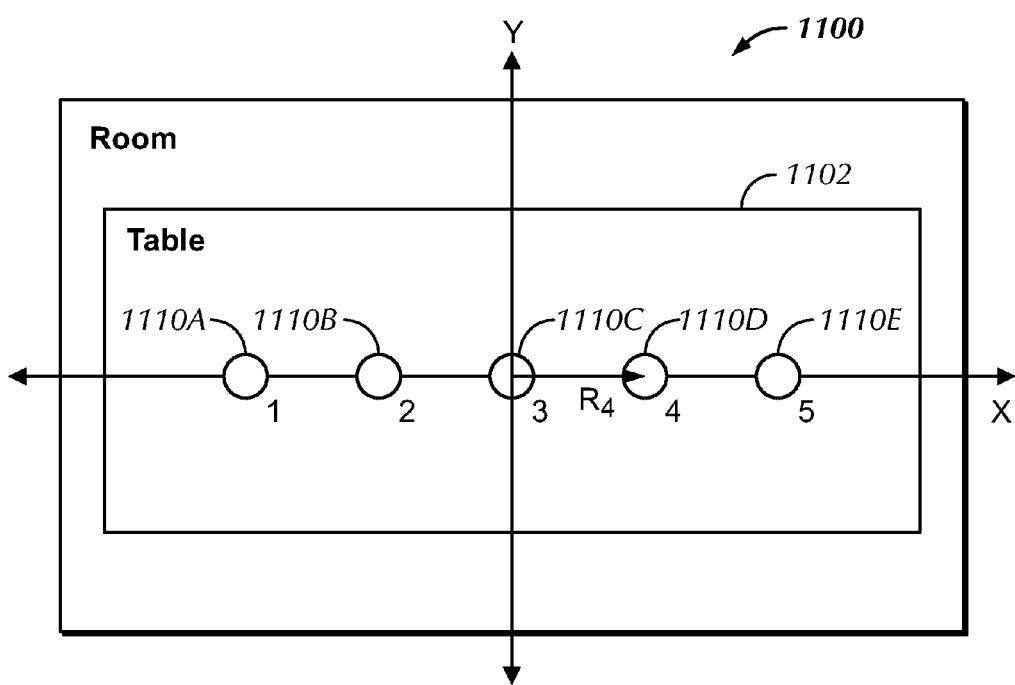
FIG. 11 is an illustration of a room including a plurality of microphones according to an embodiment of the present disclosure.

FIG. 11 is an illustration of a room 1100 including a plurality of microphones 1110A-1110E according to an embodiment of the present disclosure. Each of the plurality of microphones 1110A-1110E may be coupled to, or incorporated within, a VoIP engine that includes other processing components as described above. The plurality of microphones 1110A-1110E, in conjunction with a VoIP engine, may be configured to capture and send outgoing audio signals to a remote endpoint. In particular, FIG. 11 shows an example of how the spatial information regarding the microphones 1110A-1110E may be defined relative to a coordinate system. The coordinate system may be defined as an XY axis. As an example, the relative locations of the microphones 1110A-1110E may be defined in polar coordinates. For example, the fourth microphone 1110D may have spatial information associated therewith, such as a radius ($R_4$) and an angle relative to the coordinate system. The radius ($R_4$) may be measured from the origin of the coordinate system, and the angle may be measured from the positive X axis of the coordinate system. In the example of FIG. 11, because the fourth microphone 1110D is located on the positive X axis, the angle is 0, and therefore, not specifically shown. Each of the other microphones 1110A, 1110B, 1110C, 1110E may have spatial information associated therewith, which may be defined in a similar manner. Of course, other coordinate systems and coordinate systems may be employed for determining positions of the speakers relative to each other using a coordinate system. For example, Cartesian coordinates may be employed, such that an (X,Y) coordinate for each microphone 1110A-1110E may be determined.

In some embodiments, the microphones 1110A-1110E may be non-directional (in other words, they are omni-directional) and generate sound in all directions rather than favoring a specific direction. For example, the microphones 1110A-1110E may be located along a table 1102 in the room 1100, such that sound may be captured from participants on each side of the table 1102.

Figure 12:
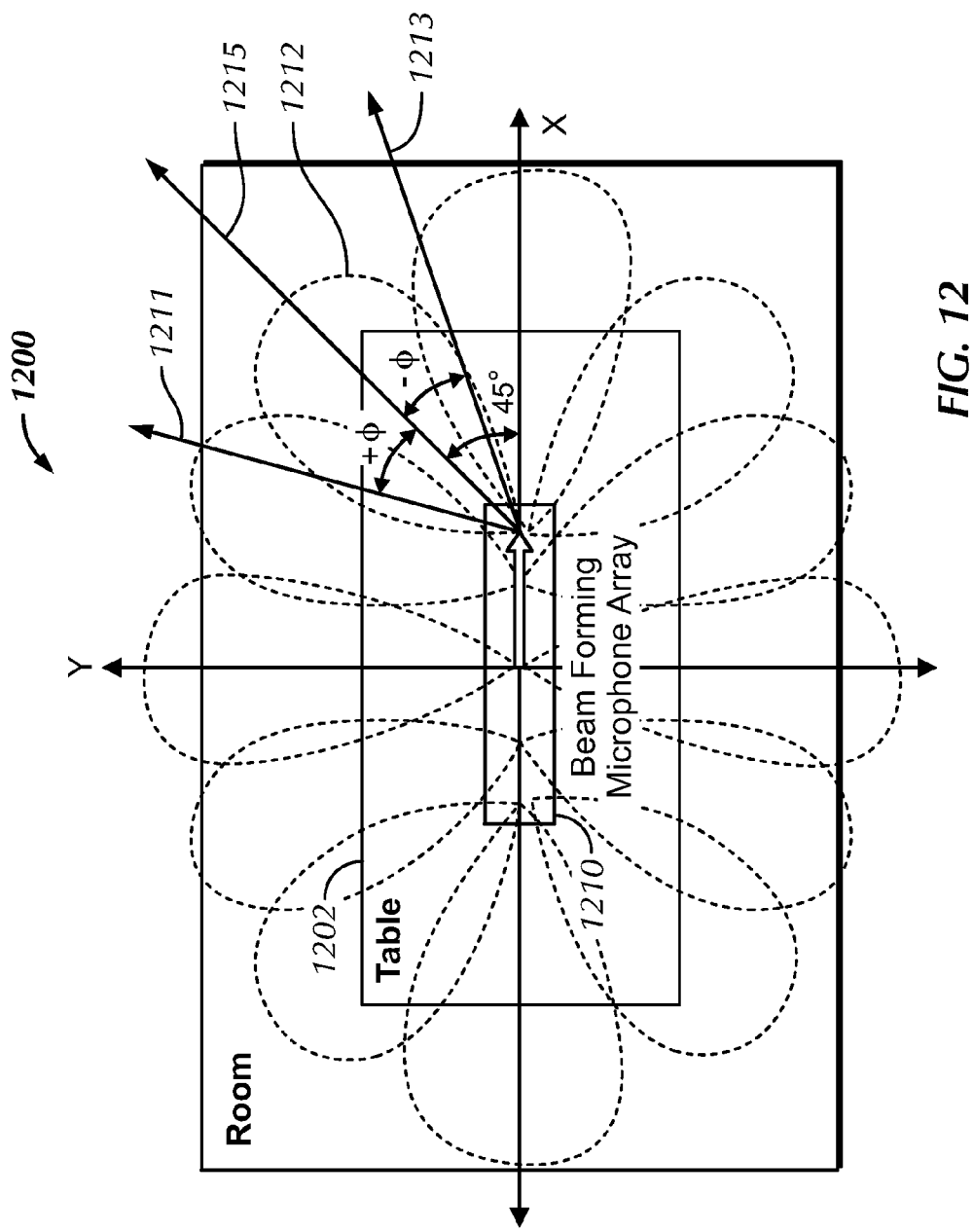
FIG. 12 is an illustration of a room including a microphone according to an embodiment of the present disclosure.

FIG. 12 is an illustration of a room 1200 including a microphone 1210 according to an embodiment of the present disclosure. The microphone 1210 may be coupled to, or incorporated within, a VoIP engine that includes other processing components as described above. The microphone 1210, in conjunction with a VoIP engine, may be configured to output outgoing audio signals to a remote endpoint. The microphone 1210 may be configured as a beam forming microphone array. Thus, the microphone 1210 will also be referred to as a microphone array 1210. In particular, the microphone 1210 may include a plurality of microphones that are directional and capture sound within a field illustrated by a lobe 1212. FIG. 12 shows an example of how the spatial information regarding the individual directional microphones of the microphone array 1210 may be defined relative to a coordinate system. The microphone array 1210 may be located along a table 1202 in the room 1200, such that sound may be captured from participants on each side of the table 1202.

As in the previous examples, the coordinate system may be defined as an XY axis, and the relative locations of the individual microphones of the microphone array 1210 may be defined in polar coordinates. For example, each individual microphone of the microphone array 1210 may have spatial information associated therewith, such as a radius and an angle relative to the coordinate system. The radius may be measured from the origin of the coordinate system, and the angle may be measured from the positive X axis of the coordinate system. In addition to the radius and angle representing the location of the individual microphone, the spatial information may further include additional angles ($\zeta$, ±Φ) representing directional characteristics of the beam. For example, the directional angle (ζ) may define the angle between the positive X axis and the general direction 1215 of the beam represented by the lobe 1212. The width angles (±Φ) represent the width of the beam between lines 1211, 1213. These additional angles (ζ, ±Φ) may be transmitted to the remote endpoint with the spatial information in order to further assist in spatial rendering of the audio signals.

Figure 13:
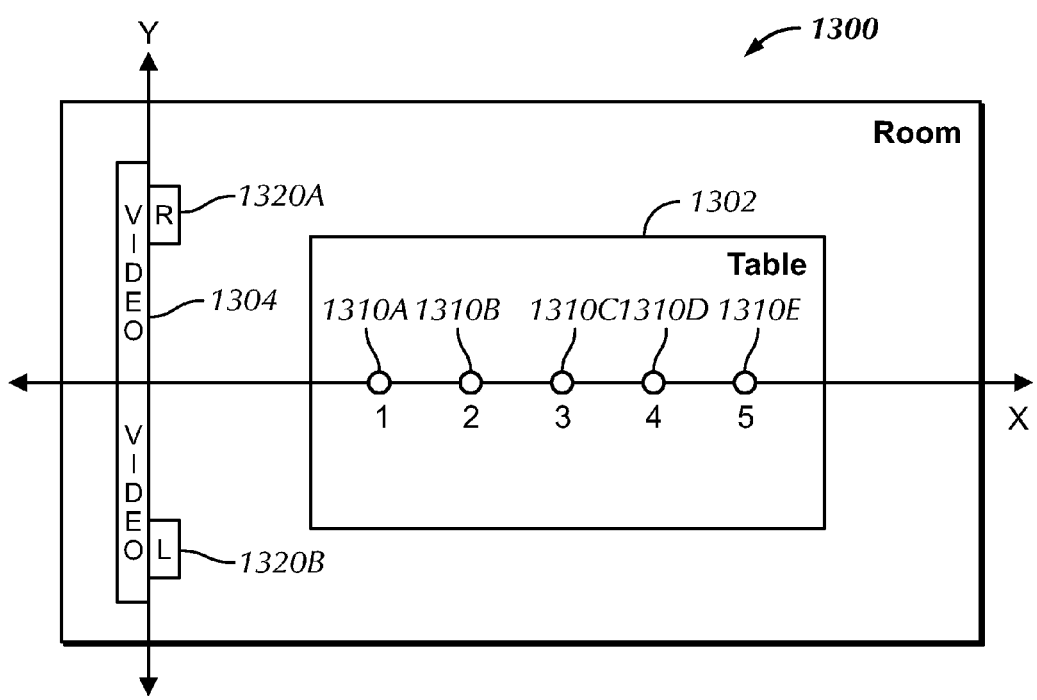
FIG. 13 is an illustration of a room including a plurality of microphones according to an embodiment of the present disclosure.

FIG. 13 is an illustration of a room 1300 including a plurality of microphones 1310A-1310E according to an embodiment of the present disclosure. Each of the plurality of microphones 1310A-1310E may be coupled to, or incorporated within, a VoIP engine that includes other processing components as described above. The plurality of microphones 1310A-1310E, in conjunction with a VoIP engine, may be configured to capture and send outgoing audio signals to a remote endpoint. As discussed in the previous examples, the spatial information regarding the microphones 1310A-1310E may be defined relative to a coordinate system (e.g., XY axis). In the example shown in FIG. 13, the origin for the coordinate system may be at a location different than near the center of the room 1300. For example, the room 1300 may be a conference room set up for video conferencing having a video screen 1304 near one end of the room 1300. The origin for the coordinate system in FIG. 13 may be proximate the front of the room 1300 near the video screen 1304.

The room 1300 also shows a plurality of speakers 1320A, 1320B positioned proximate the video screen 1304. Each of the plurality of speakers 1320A, 1320B may be coupled to, or incorporated within, a VoIP engine that includes other processing components as described above. The audio signals captured by the plurality of microphones 1310A-1310E may be spatially rendered and output to the plurality of speakers 1320A, 1320B of a remote endpoint. The plurality of speakers 1320A, 1320B may be directional speakers, which information may be sent to the microphones 1310A-1310E along with the spatial information. It should be understood that the speakers 1320A, 1320B may be part of a remote room that is different than the room 1300 including the plurality of microphones 1310A-1310E. In other words, the room 1300 is shown to act as both the local endpoint as well as the remote endpoint, for convenience in illustration to not include a figures for both. Of course, embodiments may include a single room that both captures audio signals through a plurality of microphones as well as outputs the spatially rendered audio signals within the same room.

In some embodiments, when the audio signals are spatially rendered, the coordinate system associated with the microphones 1310A-1310E may be constructed as a mirror image of the reference from for the speakers 1320A, 1320B. As a result, the sound projected from the speakers 1320A, 1320B may provide sound to the remote room such that the location of the person speaking in the local room may be apparent to the listener in the remote room. As a result, such an embodiment may provide an effect to the listeners in the remote room as if they were watching a video conference through a window rather than a two dimensional screen.

In some embodiments, a video conference may be configured to include automatic camera tracking based on which microphone is gated on. For example, the camera (not shown) that captures the video for a video conference may be focused to pan and zoom to the person speaking into a microphone (e.g., a microphone may be gated on or off when a sound is detected). Having spatial rendering of the audio signals may also enable increasing the gain to an appropriate audio channel during spatial rendering, which may have the effect of the person sounding closer than they actually are.

Figure 14:
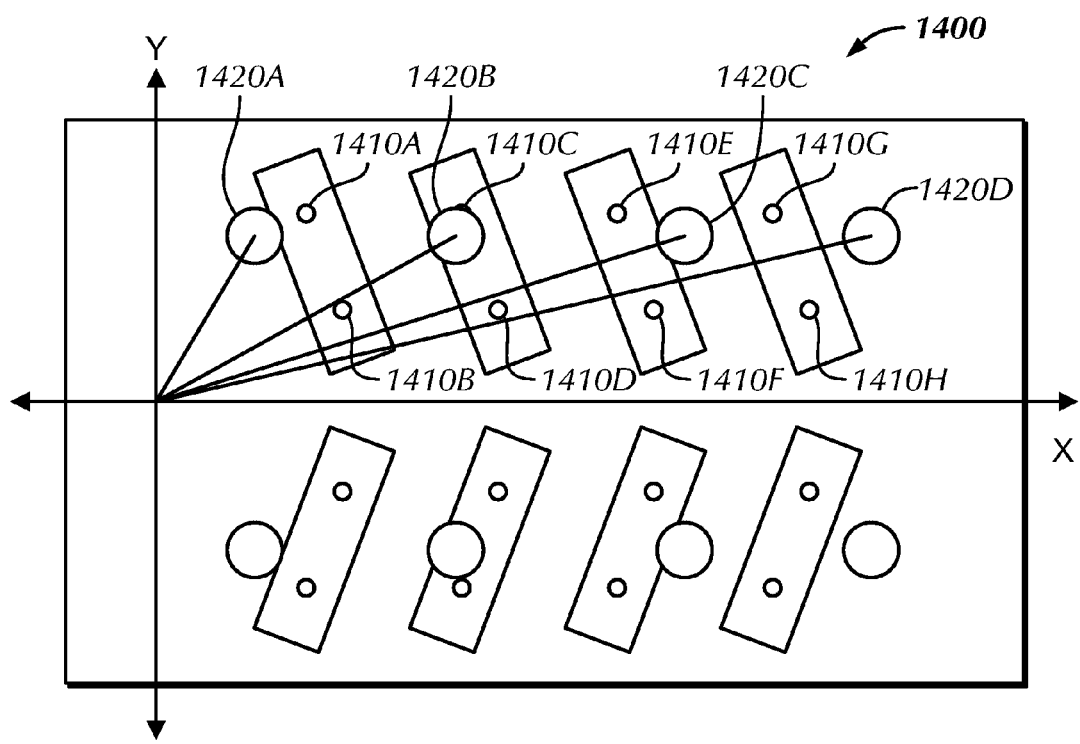
FIG. 14 is an illustration of a room including a plurality of microphones according to an embodiment of the present disclosure.

FIG. 14 is an illustration of a room 1400 including a plurality of microphones 1410A-1410P according to an embodiment of the present disclosure. Each of the plurality of microphones 1410A-1410P may be coupled to, or incorporated within, a VoIP engine that includes other processing components as described above. The plurality of microphones 1410A-1410P, in conjunction with a VoIP engine, may be configured to capture and send outgoing audio signals to a remote endpoint. As discussed in the previous examples, the spatial information regarding the microphones 1410A-1410P may be defined relative to a coordinate system (e.g., XY axis). In the example shown in FIG. 14, the origin for the coordinate system may be at a location different than near the center of the room 1400. The origin for the coordinate system in FIG. 14 may be proximate the front of the room 1400. For example, the room 1400 may be an auditorium or other room (e.g., lecture hall) set up for the primary sound source may be near one end of the room 1400. The microphones 1410A-1410P may be positioned at locations associated with a plurality of tables 1402A-1402H. The room 1400 also shows a plurality of speakers 1420A-1420H distributed along the ceiling of the room 1400. Each of the plurality of speakers 1420A-1420H may be coupled to, or incorporated within, a VoIP engine that includes other processing components as described above.

The audio signals captured by the plurality of microphones 1410A-1410H may be spatially rendered and output to the plurality of speakers 1420A-1420H of a remote endpoint. The plurality of speakers 1420A-1420H may be omni-directional speakers. As with FIG. 13, a single room is shown having both the plurality of microphones 1410A-1410H and speakers 1420A-1420H. A local endpoint and a remote endpoint for spatially rendering audio signals may be located within the same rooms or different rooms.

In some embodiments, when the audio signals are spatially rendered, the coordinate system associated with the microphones 1410A-1410 may be constructed as being superimposed with the coordinate system for the speakers 1420A-1420H. As a result, with the plurality of speakers 1420A-1420H may provide the effect of being spatially accurate. For example, a person speaking near the front of the room 1400 may translate to the speaker 1420A being louder, with the other speakers 1420B, 1420C, 1420D fading out going down the line.

Various embodiments have been described including the locations of the speakers and the microphones being fixed relative to the coordinate system defined for the rooms. In some embodiments, the speakers and/or the microphones may be movable throughout the room, such that the spatial information may be dynamically changing and sent from endpoint to endpoint with the audio streams.

The angular and radial information for the microphone may be determined based on determining a position of the microphone within the room. For example, various sensors, transmitters, etc. may be used to determine positional data from which the radial and angular information may be determined. Direction and orientation information may also change dynamically and may be re-sent as such information changes. For example, a person may be wearing a lapel microphone, and may be walking around the room. When streaming the spatially rendered audio to a remote room, the sound may also reflect this movement in the speakers.

In another embodiment, sound sources may be part of a virtual environment rather than solely in a physical environment. For example, in a gaming application, a set of players may be gaming on-line with an established conference call within rooms. As virtual players move around a screen in a virtual world, an endpoint for a remote room may be configured to spatially render audio signals speakers in a remote room based on a changing location of the virtual player in the virtual world or of the players in the physical world.

Although the foregoing description contains many specifics, these are not to be construed as limiting the scope of the present disclosure, but merely as providing certain exemplary embodiments. Similarly, other embodiments of the disclosure may be devised which do not depart from the scope of the present disclosure. For example, features described herein with reference to one embodiment also may be provided in others of the embodiments described herein. The scope of the invention is, therefore, defined only by the appended claims and their legal equivalents, rather than by the foregoing description.

What is claimed is:

1. A voice over internet protocol (VoIP) device, comprising: a second VoIP engine having a spatial renderer associated with a second endpoint, the spatial renderer configured to:
   receive a first set of spatial information for a plurality of microphones associated with a first endpoint during a call set up procedure;
   send a second set of spatial information for a plurality of speakers associated with the second endpoint to a first VoIP engine associated with the first endpoint during a call set up procedure;
   receive audio data from the first endpoint, and
   render the audio data among the plurality of speakers based, at least in part, on the first set of spatial information and the second set of spatial information;
   wherein the spatial renderer is configured to superimpose a coordinate system for the plurality of speakers and a coordinate system for the plurality of microphones during spatial rendering of the audio data.

2. The VoIP device of claim 1, wherein the audio data includes raw audio data from the first endpoint, and wherein the spatial renderer is further configured to mix the raw audio data based, in part, on the received first set of spatial information for the plurality of microphones.

3. The VoIP device of claim 1, wherein the audio data includes mixed audio data from a spatial encoder of the first endpoint.

4. The VoIP device of claim 3, wherein the mixed audio data includes a plurality of audio streams.

5. The VoIP device of claim 1, wherein a quantity of the plurality of microphones and a quantity of the plurality of speakers are not equal.

6. The VoIP device of claim 1, wherein a spatial configuration of the plurality of microphones and a spatial configuration of the plurality of speakers is substantially different.

7. The VoIP device of claim 1, wherein the spatial information is represented in polar coordinates in a coordinate system.

8. A voice over internet protocol (VoIP) conferencing system, comprising:
   a local endpoint comprising a first VoIP engine having a spatial encoder configured to send a first set of spatial information to a second VoIP engine of a remote endpoint during a call set up procedure, and receive a second set of spatial information from a spatial renderer of the second VoIP engine of the remote endpoint during a call set up procedure, wherein the first set of spatial information includes relative position information for a plurality of microphones of the local endpoint, and wherein the second set of spatial information includes relative position information for a plurality of speakers of the remote endpoint;
   wherein the spatial renderer is configured to superimpose a coordinate system for the plurality of speakers and a coordinate system for the plurality of microphones during spatial rendering of the audio data.

9. The VoIP conferencing system of claim 8, wherein the first set of spatial information further includes orientation information for the each microphone of the plurality of microphones.

10. The VoIP conferencing system of claim 8, wherein the first set of spatial information further includes directional information for each microphone of the plurality of microphones.

11. The VoIP conferencing system of claim 10, wherein the first set of spatial information further includes a beam width for each microphone of the plurality of microphones.

12. The VoIP conferencing system of claim 8, further comprising the remote endpoint comprising the spatial renderer configured to render audio data among the plurality of speakers based, at least in part, on the first set of spatial information and the second set of spatial information.

13. The VoIP conferencing system of claim 12, wherein the second set of spatial information further includes directional information for each speaker of the plurality of speakers.

14. The VoIP conferencing system of claim 8, wherein the first VoIP engine comprises at least one processor comprising the spatial encoder.

15. A method of generating a sound field in a remote room from captured audio signals in a local room, the method comprising:
   determining spatial information for a plurality of microphones in the local room;
   determining spatial information for a plurality of speakers in the remote room;
   mapping the spatial information for the plurality of microphones and the spatial information for the plurality of speakers;
   generating a sound field in the remote room based on the mapping, wherein mapping includes superimposing a coordinate system of the local room and a coordinate system of the remote room; and
   during a call setup up procedure:
      communicating the spatial information for the plurality of microphones to a first VoIP engine; and
      communicating the spatial information for the plurality of speakers to a second VoIP engine.

16. A method of generating a sound field in a remote room from captured audio signals in a local room, the method comprising:
   determining spatial information for a plurality of microphones in the local room;
   determining spatial information for a plurality of speakers in the remote room;
   mapping the spatial information for the plurality of microphones and the spatial information for the plurality of speakers; and
   generating a sound field in the remote room based on the mapping, wherein mapping includes superimposing a coordinate system of the local room and a coordinate system of the remote room as mirror images.

17. The method of claim 15, wherein mapping includes superimposing a coordinate system of the local room and a coordinate system of the remote room.

18. A method of generating a sound field in a remote room from captured audio signals in a local room, the method comprising:
- determining spatial information for a plurality of microphones in the local room;
- determining spatial information for a plurality of speakers in the remote room;
- mapping the spatial information for the plurality of microphones and the spatial information for the plurality of speakers wherein mapping includes superimposing a coordinate system of the local room and a coordinate system of the remote room; and
- generating a sound field in the remote room based on the mapping, wherein determining spatial information for a plurality of microphones includes monitoring a changing location for at least one microphone.

19. The VoIP of claim 8, wherein the spatial encoder is further configured to mix and encode raw audio data generated by a plurality of microphones of the local endpoint into a number of channels supported by the remote endpoint and based on the spatial rendering capabilities and output locations of the plurality of speakers of the remote endpoint.

\* \* \* \* \*